(12) United States Patent
Schütze et al.

(10) Patent No.: US 7,576,912 B2
(45) Date of Patent: Aug. 18, 2009

(54) MICROSCOPE TABLE AND INSERT

(75) Inventors: Karin Schütze, Tutzing (DE); Raimund Schütze, Tutzing (DE); Thomas Staltmeier, Hohenpeissenberg (DE)

(73) Assignee: P.A.L.M. Microlaser Technologies GmbH, Bernried (DE)

( * ) Notice: Subject to any disclaimer, the term of this patent is extended or adjusted under 35 U.S.C. 154(b) by 0 days.

(21) Appl. No.: 11/557,356

(22) Filed: Nov. 7, 2006

(65) Prior Publication Data

US 2007/0153369 A1    Jul. 5, 2007

Related U.S. Application Data

(63) Continuation of application No. PCT/EP2005/004750, filed on May 2, 2005.

(30) Foreign Application Priority Data

May 7, 2004    (DE)    ........................ 10 2004 022 484

(51) Int. Cl.
  *G02B 21/26*    (2006.01)
(52) U.S. Cl. .................................... 359/391
(58) Field of Classification Search .......... 359/391–395
  See application file for complete search history.

(56) References Cited

U.S. PATENT DOCUMENTS

| | | | |
|---|---|---|---|
| 4,508,435 A * | 4/1985 | Graham et al. ............... | 359/393 |
| 4,523,278 A | 6/1985 | Reinhardt et al. ........... | 364/413 |
| 4,682,891 A | 7/1987 | De Macario et al. ........ | 356/244 |
| 4,918,611 A | 4/1990 | Shyu et al. ............. | 364/474.08 |
| 5,031,099 A | 7/1991 | Kettler ................. | 364/999.999 |
| 5,568,384 A | 10/1996 | Robb et al. ............. | 364/419.13 |
| 5,790,692 A | 8/1998 | Price et al. .................. | 382/133 |
| 6,118,582 A | 9/2000 | Del Buono .................. | 359/398 |
| 6,381,353 B1 | 4/2002 | Weiss ......................... | 382/133 |
| 6,528,279 B2 | 3/2003 | Yokota et al. .............. | 435/40.5 |
| 6,594,586 B1 | 7/2003 | Song et al. .................... | 702/19 |
| 6,713,264 B2 | 3/2004 | Luttermann et al. ........ | 435/70.1 |

(Continued)

FOREIGN PATENT DOCUMENTS

DE    82 20 792 U1    10/1982

(Continued)

OTHER PUBLICATIONS

BIO Spectrum vol. 10, No. 3 (2004), New Application Fields of Laser Microdissection in Research and Practice, Renate Burgemeister pp. 332-334.
Brochure of P.A.L.M. (2003): PALM MicroBeam IP-MS+Metafax P.

*Primary Examiner*—Joshua L Pritchett
(74) *Attorney, Agent, or Firm*—Fitzpatrick, Cella, Harper & Scinto

(57) ABSTRACT

The present invention relates to a microscope table (1) having a recess (6) for receiving at least one object-holder means. Said recess (6) is dimensioned in such a way that it is suitable for receiving a standard microtiterplate. For this purpose, said recess preferably comprises a substantially rectangular region with a length of at least 86 mm and a width of at least 128.3 mm. The device also relates to an insert for holding at least one object-holder means, which insert has a substantially rectangular shape with a width and length which correspond to the width and length, respectively, of a standard microtiterplate.

26 Claims, 11 Drawing Sheets

U.S. PATENT DOCUMENTS

| | | |
|---|---|---|
| 6,867,038 B2 | 3/2005 | Liotta et al. ............... 435/29 |
| 6,936,826 B2 * | 8/2005 | Casa et al. ............. 250/441.11 |
| 6,991,714 B1 | 1/2006 | Gauss et al. ............. 204/462 |
| 2001/0023062 A1 * | 9/2001 | Ostade et al. ............... 435/4 |
| 2001/0033414 A1 | 10/2001 | Yahiro ..................... 359/383 |
| 2002/0048747 A1 | 4/2002 | Ganser ..................... 435/4 |
| 2002/0081014 A1 | 6/2002 | Ravkin .................... 382/134 |
| 2002/0101654 A1 * | 8/2002 | Pfeifer ..................... 359/391 |
| 2003/0203461 A1 | 10/2003 | Bova ..................... 435/173.7 |
| 2004/0023320 A1 | 2/2004 | Steiner et al. ........... 435/40.5 |
| 2004/0026630 A1 | 2/2004 | Mohun et al. ............ 250/458.1 |
| 2004/0071320 A1 | 4/2004 | Pfister .................... 382/131 |
| 2005/0163659 A1 | 7/2005 | Duveneck et al. ............ 422/61 |
| 2005/0225852 A1 * | 10/2005 | Rondeau et al. ............ 359/393 |
| 2007/0153369 A1 | 7/2007 | Schütze et al. ............ 359/391 |

FOREIGN PATENT DOCUMENTS

| | | |
|---|---|---|
| DE | 38 36 716 A1 | 5/1990 |
| DE | 42 11 904 A1 | 11/1992 |
| DE | 196 16 216 A1 | 10/1997 |
| DE | 196 29 141 A1 | 4/1998 |
| DE | 198 04 800 C2 | 8/1999 |
| DE | 198 15 400 A1 | 10/1999 |
| DE | 695 10 925 T2 | 2/2000 |
| DE | 100 37 203 C1 | 4/2002 |
| DE | 102 29 880 A1 | 1/2004 |
| DE | 10 2004 051 508 | 6/2005 |
| DE | 10 2004 023 262.8 | 12/2005 |
| EP | 0 014 857 A1 | 9/1980 |
| EP | 0 100 475 | 2/1984 |
| WO | WO 90/10273 A1 | 9/1990 |
| WO | WO 96/09594 A1 | 3/1996 |
| WO | WO 97/29355 A1 | 8/1997 |
| WO | WO 01/33190 A2 | 5/2001 |
| WO | WO 01/73398 A1 | 10/2001 |
| WO | WO/02/10834 | 2/2002 |
| WO | WO 02/48949 A1 | 6/2002 |
| WO | WO 02/084368 A1 | 10/2002 |
| WO | WO 02/093450 A1 | 11/2002 |
| WO | WO 03/036266 A1 | 5/2003 |
| WO | WO 03/090169 A1 | 10/2003 |
| WO | WO 03/096018 A2 | 11/2003 |
| WO | WO 03/105675 A2 | 12/2003 |
| WO | WO 2004/025569 A2 | 3/2004 |
| WO | WO 2005/040762 A | 5/2005 |
| WO | WO 2005/114135 | 12/2005 |

\* cited by examiner

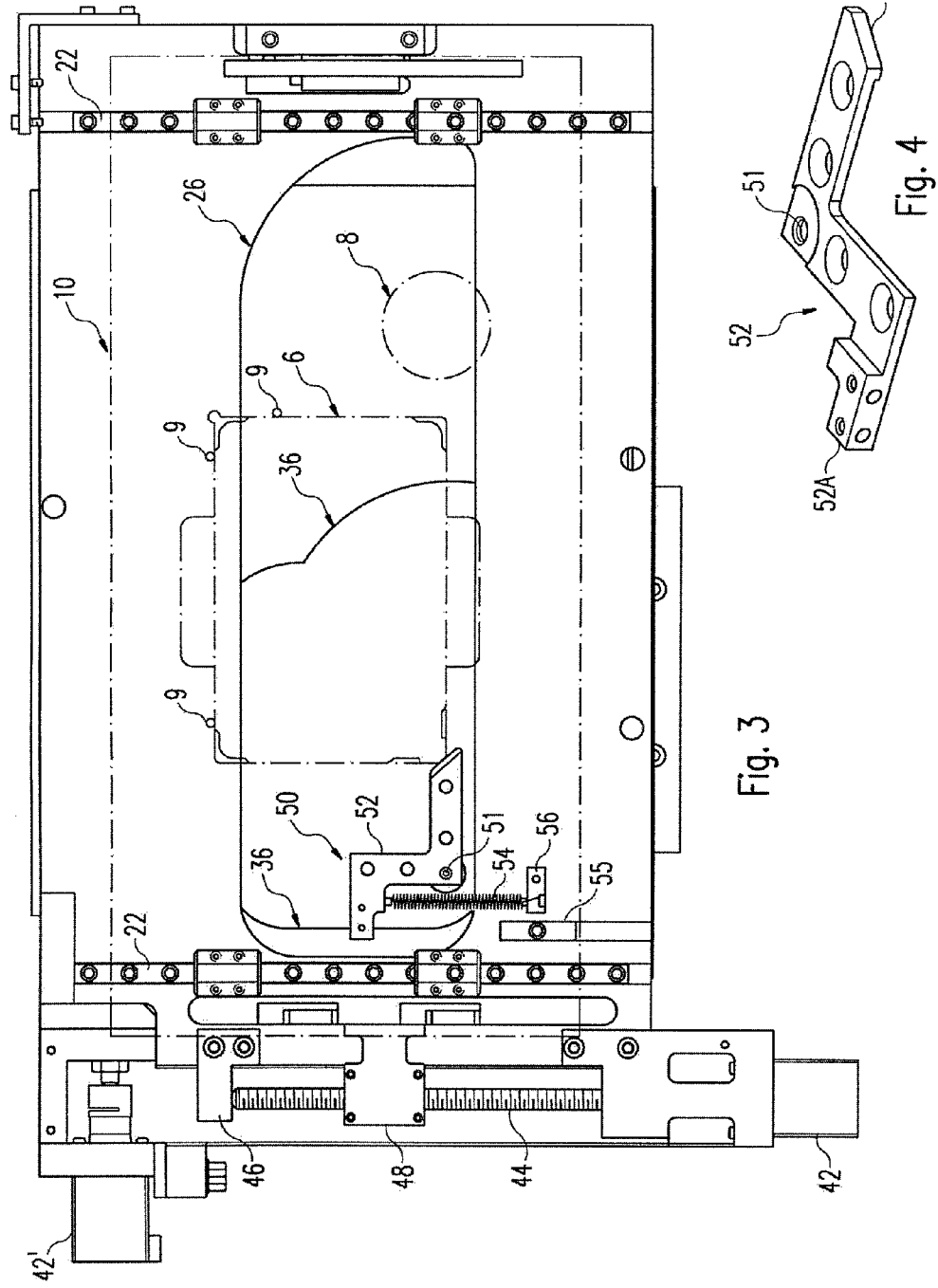

MICROSCOPE TABLE AND INSERT

This application is a continuation of International Application PCT/EP2005/004750, with an international filing date of May 2, 2005, which claims the benefit of German Application No. 10 2004 022 484.6, filed May 7, 2004, the priorities of both of which are hereby claimed. The International Application is incorporated by reference herein in its entirety, and was published in German as International Publication No. WO 2005/114104 on Dec. 1, 2005.

The present invention relates to a microscope table, in particular a microscope table for use with different types of microscopes and with a laser apparatus for processing and/or separating biological or non-biological objects, and also to an insert for receiving object-holder means.

A microscope table of this type is known from DE 100 37 203 C1. This microscope table can be employed universally for different types of microscopes and has a receiving device, which is preferably configured in the form of an interchangeable insert, for receiving an object-holder. In this instance, the receiving device terminates flush with an upper boundary surface of the microscope table and has a recess in which a rectangular object-holder, for example a glass object-holder, can be inserted.

The microscope table is particularly suitable for a microscope which is coupled to a laser apparatus in order to be able to process and/or separate individual biological and/or non-biological objects located on the object-holder. A laser apparatus of this type is described in WO 97/29355 A1. In the latter, it is proposed to separate a selected, for example biological, object from the surrounding biological mass by means of a laser beam, so that the selected biological object is prepared to be free from said surrounding biological mass. The biological object is then catapulted from the object-holder to a receiving device with the aid of a laser shot, whereby the receiving device may be, for example, a receiving substrate or the like. In an arrangement of this kind, the objective of the microscope may be disposed, for example, above the object-holder, while the laser apparatus is located below the latter. The receiving device may be configured in such a way that it can be displaced into the light path of the microscope or laser.

As a rule, different types of object-holder means are employed for microbiological preparations and/or investigations. The means in question may, in addition to ordinary rectangular glass object-holders, also be so-called "microtiterplates". A microtiterplate is a container system with a large number of containers which are disposed in a regular, rectangular grid arrangement. The typical number of containers in a microtiterplate is 96 (8 rows of 12 containers each), but microtiterplates with, for example, 6, 12, 24 or 384 containers are also known. Irrespective of the number of containers, the microtiterplates have substantially identical lateral dimensions, that is to say a substantially identical length and width. In order to further standardise the design of microtiterplates and thus guarantee, for example, improved compatibility between the laboratory facilities of different laboratories, the so-called "ANSI/SBS 1-2004" standard was recently defined, so that there is a uniform guideline for the width and length of microtiterplates.

According to this standard, standard microtiterplates have a substantially rectangular shape with a width of 127.76±0.5 mm and a length of 85.48±0.5 mm. Under these circumstances, the containers for receiving objects are disposed in a region having a width of 114 mm and a length of 76 mm. Numerous instruments used in laboratories, for example incubators or so-called "stacks", are especially suitable for receiving these standard microtiterplates.

One disadvantage of previous microscope tables, especially when used in association with a laser apparatus for preparing and separating biological or non-biological material as described above, consists in the fact that these microscope tables are not adapted to the dimensions of standard microtiterplates. As a result of this, it is necessary, on the one hand, to transfer objects onto object-holder means which are suitable for the microscope table, in order to be able to carry out preparations or investigations. These object-holder means have dimensions that differ from the standard microtiterplates so that, on the other hand, said object-holder means cannot be used in association with those instruments which are adapted to the dimensions of said standard microtiterplates. This results in considerable expenditure as regards the transfer of biological or non-biological objects to or from the object-holder means.

The object of the present invention therefore consists in making available a microscope table which solves the problems described above and which permits, in particular, the simplified equipping of said microscope table with biological or non-biological objects disposed on suitable object-holder means.

This object is achieved by means of a microscope table according to claim 1 and/or an insert according to claim 15 for receiving at least one object-holder means. The dependent claims define preferred and advantageous forms of embodiment of the invention.

According to the invention, the microscope table has a recess for receiving at least one object-holder means.

Said recess is formed, for example, in an upper boundary surface of the microscope table. According to the invention, the recess is dimensioned in such a way that it is suitable for receiving a standard microtiterplate. For this purpose, the recess preferably has, in the plane of the microscope table, a rectangular region with a length of at least 86 mm and a width of at least 128.3 mm.

In the case of the microscope table according to the invention, it is possible to insert microtiterplates directly into said table. For microbiological investigations or preparations, the corresponding biological objects are, in any case, often already located in containers of standard microtiterplates. It is thus possible to avoid the necessity, for the desired investigations and/or preparations, of further transferring the objects onto object-holder means which are suitable for the microscope table. However, it is also possible to employ object-holder means which differ from the standard microtiterplates, as long as their dimensions do not exceed those of a standard microtiterplate. As a result of this, the microscope table according to the invention is suitable for a large number of object-holder means of different types.

The microscope table preferably comprises retaining means which are suitable for holding and aligning in the recess, by clamping it, the object-holder means which has been inserted in said recess. Under these circumstances, the retaining means, which are based on clamping, may at the same time guarantee holding of the object-holder means and its alignment with respect to the microscope table.

The clamping of the object-holder means preferably takes place laterally with respect to the side walls of the recess, so that the correspondingly configured retaining means permit reliable mounting and alignment of the object-holder means in a simple manner.

The microscope table is preferably configured so as to be capable of travel in a longitudinal direction and in a width direction, under which circumstances a maximum path of travel of the microscope table in the longitudinal direction corresponds at least to the length of that region of a standard microtiterplate which can be used for receiving objects, and a maximum path of travel of the microscope table in the width direction corresponds at least to the width of the said region which can be used for receiving objects. These paths of travel guarantee that each object on the object-holder means inserted in the recess can be conveyed to a specific point in the plane of the microscope table, so that, if the said specific point is defined, for example, by the optical axis of the microscope, each object located in or on the object-holder means can be conveyed into said optical axis of the microscope. In this way, the investigation or preparation of objects is possible over that entire extent of the object-holder means which can be used for receiving objects.

Moreover, it is particularly advantageous if the microscope table, or the recess constructed therein, can be moved into a loading position. Said loading position is preferably disposed, with respect to at least one of the directions of travel, for example the width direction, close to the maximum path of travel of the microscope table. This means that, in the loading position, the entire object-holder means can be located outside the optical axis of the microscope, so that removal of said object-holder means, or insertion of the latter, is not hindered by components of the microscope, for example an objective or a condenser lens belonging to the latter.

Under these circumstances, it is also advantageous to configure the retaining means belonging to the microscope table in such a way that the clamping of the object-holder means is automatically released in the loading position. Conversely therefore, automatic mounting and alignment of the object-holder means by clamping takes place when the microscope table is moved out of the loading position and into a working position, that is to say into the optical axis or light path of the microscope. As a result of this coupling of the retaining means with the position of the microscope table, the insertion of the object-holder means or its removal can take place in the loading position without the application of force, as a result of which these operations are significantly simplified.

A hole region is preferably formed inside the recess for receiving the object-holder means, so that there is visual access, both from above the microscope table and from below it, to the object-holder means inserted in said recess. This guarantees that the microscope table can be used even in arrangements which provide for optical components both above the microscope table and below it. For example, it is possible for an objective for observing objects on the object-holder means to be disposed above the microscope table, while a light source belonging to the microscope and/or a laser apparatus for manipulating said objects is disposed below said microscope table.

The recess is preferably constructed as a hole region in a plate-shaped part of the microscope table, under which circumstances projections, which delimit said recess towards one side of the plate-shaped part, preferably downwards, are constructed on edges of said hole region. The object-holder means can thus be inserted into the hole region, the projections forming a stop which prevents said object-holder means from being passed completely through said hole region. The object-holder means is thus held in position laterally by the side walls of the recess and, in a vertical direction perpendicular to the plane of the microscope table, by the projections. Said projections preferably have an extent which is small, compared to the extent of the hole region, so that only a small portion of the object-holder means is masked by the projections.

The microscope table preferably has another hole region which is disposed close to the recess. Under these circumstances, the paths of travel of said microscope table are preferably configured in such a way that the hole region disposed close to the recess can be brought into an observation position in which the optical axis of the microscope provided with said microscope table extends through this hole region. The hole region disposed close to the recess serves to clear a light path for observing objects which are not disposed on the microscope table. The objects in question may be, in particular, objects in a receiving device into which the objects have been transferred from the object-holder means by means of a laser shot. In a microscope system which is provided with a laser apparatus in order to catapult objects from the object-holder means into a receiving device, it is desirable to check, after the catapulting operation, whether the object has also been catapulted to the desired position. For this purpose, it is necessary to dispose the receiving device in the light path, under which circumstances, however, the object-holder means is then likewise located in the light path in the case of a conventional microscope table. In order to clear the light path for checking purposes, it is therefore necessary, in the case of a conventional microscope table, to remove the object-holder means.

As a result of the additional hole region which is formed in the microscope table, it is possible to move the object-holder means out of the light path and to clear the latter, without it being necessary, for this purpose, to remove said object-holder means from said light path. This hole region thus considerably improves the possibilities of checking whether an object has been successfully catapulted to a desired position. This feature is particularly advantageous in association with a microscope table according to the invention, which has the recess described which is suitable for receiving a standard microtiterplate. However, the additional hole region is also of advantage in other microscope tables which have differently shaped means for receiving object-holder means.

According to the present invention, the path of travel of the microscope table preferably amounts to at least 161 mm in the width direction and at least 76 mm in the longitudinal direction. As a result of this, the abovementioned requirements as regards the paths of travel are fulfilled.

At least one clearance region, which makes it easier to insert the object-holder means in the recess, or to remove it from the latter, is preferably formed at the edge of the recess. In particular, it is also possible to provide a number of such clearance regions. In these clearance regions, the recess has a shape which differs from the outer contour of the object-holder means, so that the lateral edges of said object-holder means, which is inserted in the recess, are exposed. It is thus possible, in the clearance regions, to grip the object-holder means at its outer edges. It is particularly advantageous if the depth of the clearance regions is greater than the depth of the recess, so that it is possible to also grip under the object-holder means, for example by means of a tool, in said clearance regions. The clearance regions formed at the edges of the recess thus significantly facilitate the insertion of the object-holder means in, or its removal from, the recess.

The insert according to the invention for receiving at least one object-holder means has a substantially rectangular shape with a width and length which correspond to the width and length, respectively, of a standard microtiterplate. This being the case, the length is preferably 85.5 mm, and the width 127.8 mm.

The insert is thus constructed in such a way that its outer shape and dimensions correspond to those of a standard microtiterplate. As a result of this, the insert can, in particular, be inserted in the recess of the microscope table according to the invention. By means of the insert according to the invention, it is possible to insert other types of object-holder means, which have shapes and/or dimensions that differ from a standard microtiterplate, in the microscope table. Such object-holder means may, in particular, be glass object-holder means according to DIN ISO 8037-1 or a Petri dish. Furthermore, since the insert corresponds, in its dimensions and shape, with a standard microtiterplate, it can be used with a large number of instruments, for example, incubators or stacks, which are adapted to standard microtiterplates, so that a large number of different object-holder means can be employed in association with these instruments by means of the insert according to the invention.

The insert preferably has retaining means for holding the at least one object-holder means in said insert. These retaining means may, in particular, be ones which are configured for holding the object-holder means by clamping. Clamping provides for rapid and reliable fastening of the object-holder means or a plurality of object-holder means in the insert.

Said insert preferably has at least one recess which is suitable for receiving at least one object-holder means. The insert may, in particular, be configured for receiving a number of object-holder means, in which case a recess may be provided for each of said object-holder means, or a number of object-holder means may be disposed in a common recess.

The clamping of the object-holder means in the insert preferably takes place laterally with respect to the side walls of the at least one recess in the insert. As a result of this, the retaining means in a simple manner allow for, at the same time, the mounting and alignment of the object-holder means in the insert.

The at least one recess in the insert preferably has a region which substantially corresponds, in its shape, to the contour of the object-holder means to be received, that is to say a rectangular region for rectangular object-holder means, for example in the form of glass object-holders, or a circular region for round object-holder means, for example in the form of a Petri dish.

Under these circumstances, the lateral extent, that is to say the extent in the plane of the insert, of this region of the recess corresponds at least to that of the object-holder means to be received. The extent may also be an integral multiple of that of said object-holder means, so that, for example, a number of glass object-holders can be disposed side by side along the width direction of the insert.

In order to permit free access to the object-holder means or plurality of object-holder means, both from above and from below, a hole region is preferably formed in the insert. As already explained above in the case of the recess in the microscope table, it is advantageous to configure said recess or recesses in the insert as a hole region, under which circumstances projections, which delimit said recess towards one side of the insert, preferably downwards, are formed at the edges of the hole region.

The insert according to the invention is preferably configured for insertion in the recess in a microscope table according to the invention. As a result of this, said microscope table according to the invention can be used with a large number of different object-holder means. The invention also relates to a microscope table system with a microscope table according to the invention and at least one insert according to the invention.

The present invention offers the advantage that the equipping of a microscope with objects to be investigated or prepared is significantly simplified. In particular, it is possible, in the case of objects which are already located in or on an object-holder means which has the overall dimensions of a standard microtiterplate, to dispense with transferring the said objects to another object-holder means. The insertion and removal of said object-holder means is significantly simplified. In association with the insert according to the invention, it is possible, in the case of the microscope table according to the invention, to use a large number of different object-holder means. In addition to standard microtiterplates, use may therefore also be made of glass object-holder means or Petri dishes. In the case of object-holder means which have a smaller extent than standard microtiterplates, it is possible, by means of the insert, to also insert a plurality of object-holder means in the microscope table at the same time. A suitable insert can be manufactured for almost any desired object-holder means which does not exceed the dimensions of a standard microtiterplate. The inserts can be changed very easily and are compatible with a large number of instruments which are adapted to the dimensions of standard microtiterplates. The total region, which can be used for receiving objects, of an object-holder means having the overall dimensions of a standard microtiterplate is accessible for investigation or preparation purposes. The hole region in the microscope table permits, or significantly simplifies, the observation of objects that have been received in a receiving container.

The invention will be explained in greater detail below with reference to the appended drawings and with the aid of a preferred exemplified embodiment.

FIG. 3 is a plan view of the microscope table from FIG. 1, an upper plate of said microscope table being represented in a transparent manner.

FIG. 4 shows a perspective view of a clamping lever belonging to retaining means on the microscope table from FIG. 1.

Figure 1:
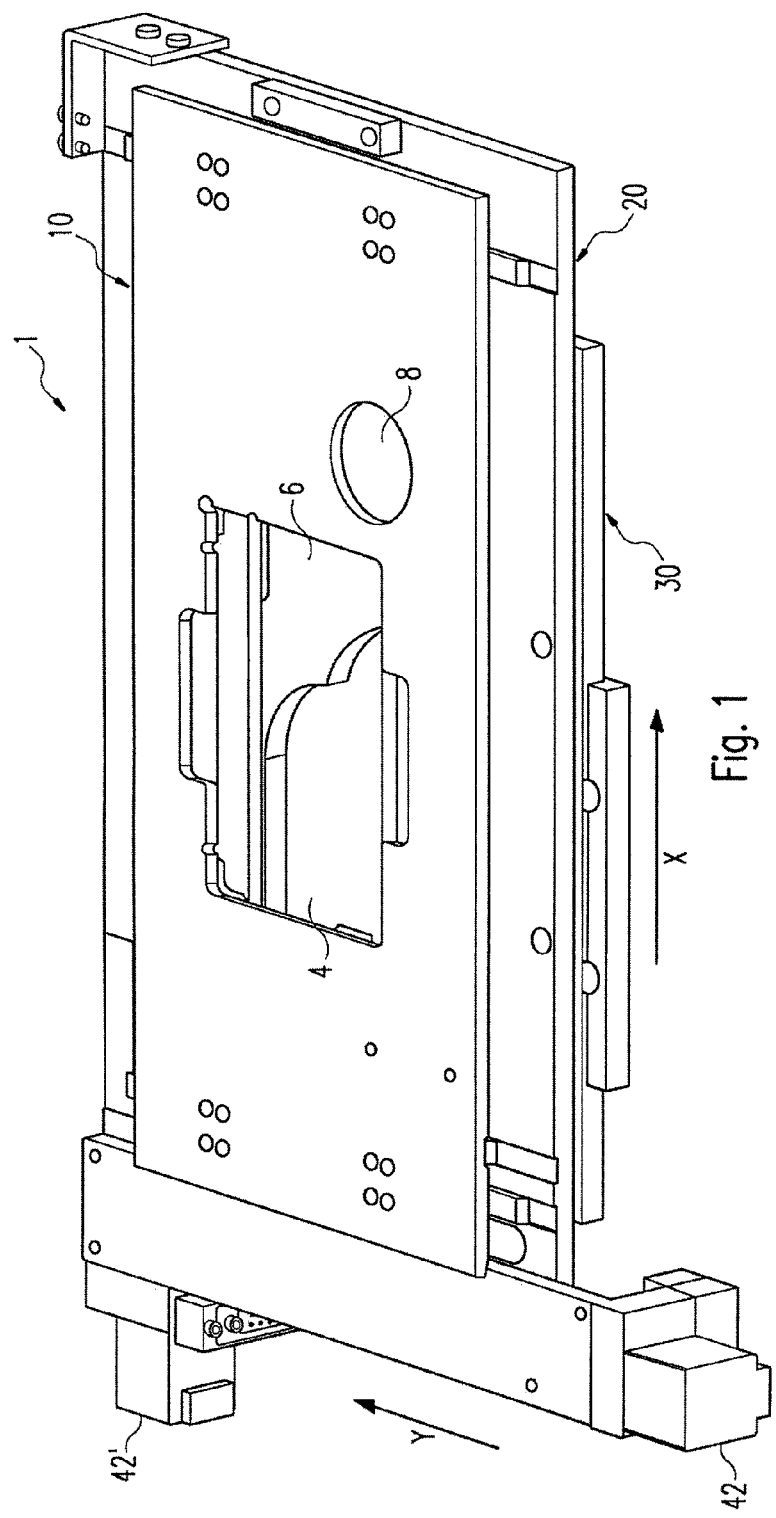
FIG. 1 is a perspective view of a microscope table according to one exemplary embodiment of the invention.

FIG. 1 is a perspective view of a microscope table 1. Said microscope table 1 comprises an upper plate 10, a central plate 20 and a lower plate 30. Said lower plate 30 is configured for fastening to a table or stand of a microscope. The central plate 20 is fastened in a carriage-like manner on the lower plate 30 so that it is displaceable in a width direction with respect to said lower plate 30. The upper plate 10 is again mounted in a carriage-like manner on the central plate 20 so that it is displaceable in a longitudinal direction with respect to the central plate 20 and the lower plate 30.

The microscope table 1 is preferably manufactured from metal, for example aluminium, although it is also possible to manufacture individual components of said microscope table 1 from plastic.

The width direction is indicated in FIG. 1 by an arrow which is designated by x, and the longitudinal direction is indicated in FIG. 1 by an arrow designated by y.

For each of the possible directions of displacement, the microscope table 1 is provided with a thread-type drive (not represented in FIG. 1), each of which drives is driven by a stepping motor 42, 42'. The microscope table 1 is thus configured so as to be capable of travel in the longitudinal direction and in the width direction. Position sensors (not represented in FIG. 1) are provided for detecting the position of the microscope table 1. The microscope table is provided with a control connection via which it can be connected to a control unit for the purpose of controlled positioning.

As can be seen from FIG. 1, a recess 6, which comprises a substantially rectangular region, is formed in the upper plate 10 of the microscope table 1. The rectangular region is dimensioned in such a way that it is suitable for receiving a standard microtiterplate. For this purpose, said rectangular region has, in particular, a width of 129 mm and a length of 87 mm, so that a standard microtiterplate with a rectangular shape, which complies with standard ANSI/SBS 1-2004, can be inserted with little tolerance in the rectangular region of the recess 6.

From FIG. 1, it can also be seen that the recess 6 is constructed as a hole region in the upper plate 10. The central plate 20 and the lower plate 30 likewise comprise hole regions, resulting in an uninterrupted hole region 4 for the microscope table 1 as a whole. Said uninterrupted hole region 4 in the microscope table 1 permits an uninterrupted light path for a microscope lens system which has components that are disposed both above and below the microscope table 1. In particular, there may also be disposed, above or below said microscope table 1, a laser apparatus with the aid of which biological or non-biological objects on object-holder means which are disposed in the recess 6 can be catapulted into a receiving device.

Under these circumstances, the hole regions in the central plate 20 and lower plate 30 are configured in such a way that an uninterrupted light path through the hole region 4 is produced for each point in the plane of the recess 6 which can be brought into the optical axis of the microscope as a result of moving the microscope table 1.

In addition to the recess 6, there is formed in the upper plate 10 an additional hole region 8 which can be positioned with respect to the central plate 20 and the lower plate 30, by moving the microscope table 1, in such a way that an uninterrupted light path is once again produced. In contrast to the recess 6, however, the additional hole region 8 is not intended for receiving an object-holder means, so the uninterrupted light path through said additional perforated region 8 can be used for observation purposes. In particular it is possible, with the aid of the additional hole region 8, to observe objects which have been catapulted, by means of a laser apparatus from object-holder means which are disposed in the recess 6 into a receiving device. The receiving device may, for example, be disposed above the microscope table, so that it is possible, by moving said microscope table, to provide an uninterrupted light path through the hole region 8, which light path allows for observing objects in the receiving device.

Figure 2:
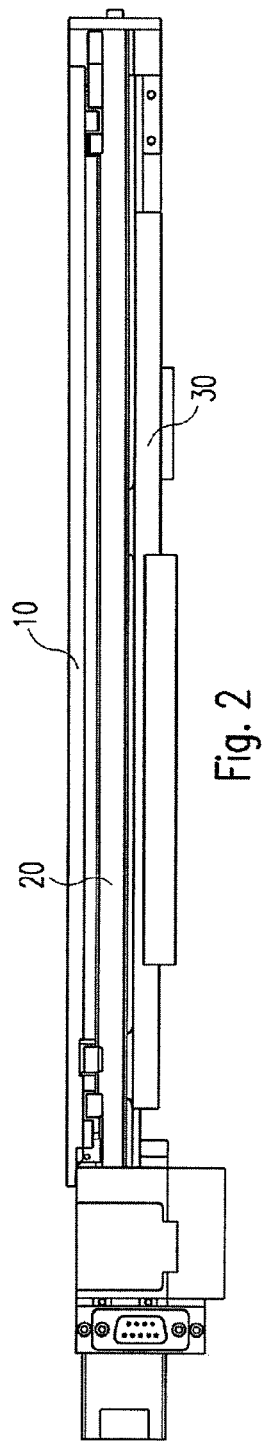
FIG. 2 is a side view of the microscope table from FIG. 1, in a width direction.

FIG. 2 shows a side view of the microscope table 1, which illustrates the arrangement of the upper plate 10, the central plate 20 and the lower plate 30. In particular, it can be seen that the upper boundary surface of the microscope table 1 is formed by the upper boundary surface of the upper plate 10, resulting in a flat plane of the table beyond which no component of the microscope table protrudes. In particular, all the components of the drive, or rather the entire mechanism of the drive for adjusting the microscope table 1 in the x and y directions, are attached to the underside of said microscope table 1.

There are therefore no superstructures or projecting elements of the microscope table 1 which might come into contact, in the course of movement, with components of the microscope, for example an objective belonging to the latter, as a result of which the capacity of the microscope table 1 for movement would be restricted.

FIG. 3 shows a plan view of the microscope table 1, in which the upper plate 10 is represented in a transparent manner by means of a chain-dotted line. As a result of this, the hole region 26 of the central plate 20 and also parts of the hole region 36 of the lower plate 30 can be seen in FIG. 3. The hole region 26 of the central plate 20 has an increased width, compared to the hole region 36 in the lower plate 30, so that an uninterrupted light path through the hole regions of the central plate 20 and lower plate 30 is always produced when said central plate 20 is moved with respect to said lower plate 30.

Rail-type means 22, which are disposed in the longitudinal direction and are fitted on the central plate 20 and on which the upper plate 10 is displaceably mounted, can also be seen in FIG. 3.

The reference numerals 44, 46 and 48 designate elements belonging to a conveying drive for moving the upper plate 10 with respect to the central plate 20 in the longitudinal direction. Said conveying drive is based on a thread-type drive 44 on which a spindle-nut housing 48 is located. Said thread-type drive 44 is mounted on the central plate 20 by bearing means 46, the spindle-nut housing 48 being connected to the upper plate 10 via an entertainment means. The upper plate 10 is thus moved in the longitudinal direction with respect to the central plate 20 by rotation of the thread-type drive 44.

As can be seen from FIG. 3, the microscope table 1 is equipped with retaining means 50 which are suitable for holding, by means of clamping, an object-holder means which has been inserted in the recess 6 in the latter. Said retaining means 50 comprise a clamping lever 52 which is supported in a rotatable manner on the upper plate 10 at a bearing point 51. Said clamping lever 52 is connected, at one end, to a spring means 54 in the form of a draw-spring. Said spring means 54 is connected, at one end, to the clamping lever 52 and, at the other end, to a bearing point 56 which is disposed in a fixed manner on the upper plate 10. The clamping lever 52 is positioned in such a way that its other end, which is not connected to the spring means 54, protrudes laterally into the recess 6 at one corner of the latter. As a result of rotation of the clamping lever 52 against the elastic force of the spring means 54, the end of said clamping lever 52 moves laterally out of the recess 6. With the clamping lever 52 in this position, an object-holder means can be inserted in said recess 6 without the application of force. If, after this, the clamping lever 52 is moved back in the direction of its original position by the elastic force of the spring means 54, the object-holder means is clamped laterally in the recess 6 between the clamping lever 52 and the side walls of said recess 6. The object-holder means is held in the recess 6 and, at the same time, aligned in the latter, as a result of being clamped.

Attached to the side walls of the recess 6 which lie opposite the retaining means 50 are pins 9 which protrude laterally into the recess 6 and thus form defined contact points for clamping the object-holder means laterally. This allows for improved mounting and alignment of the object-holder means in the recess 6.

FIG. 4 shows the clamping lever 52 of the retaining means 50. Said clamping lever 52 has a shape which is angled twice, the bearing point 51 for mounting said clamping lever on the upper plate 10 in a rotatable manner being disposed at the vertex of one of the angles. Said clamping lever 52 has substantially the shape of a plate, the thickness of which is increased at ends 52A, 52B of the clamping lever 52. Specifically, the thickness of said clamping lever 52 is increased at a first end 52A in such a way that a step is produced which is directed towards the central plate 20 and lower plate 30 when the clamping lever 52 is in the installed condition. At the second end 52B of the clamping lever 52, the thickened portion is constructed in such a way that a step is produced which is directed towards the upper plate 10 when the clamping lever 52 is in the installed condition.

The thickened portion at the second end 52B of the clamping lever 52 provides that the latter, which is located on the underside of the upper plate 10, is able to protrude laterally into the recess 6 in the upper plate 10 in a suitable manner with its second end 52B. As a result of the thickened portion at the end 52B, an enlarged contact surface between the object-holder means, which has been gripped in, and the clamping lever 52 is achieved, and an improved clamping action is thus obtained.

When the clamping lever 52 is in the installed condition, the thickened portion at the first end 52A of the clamping lever 52 extends in the direction of the central plate 20 and the lower plate 30 of the microscope table 1. The thickness of the thickened portion at the first end 52A is selected in such a way that, when said microscope table 1 is moved into a loading position, this thickened end comes into contact with a structure on the central plate 20 or lower plate 30 and the clamping lever is thereby rotated against the elastic force of the spring means 54, as a result of which the clamping of the object-holder means in the recess 6 is released. Such a structure on the central plate 20 or lower plate 30 may, for example, be an edge of the hole regions 26, 36 formed therein, or an unlocking part specifically provided for this purpose.

An unlocking part of this kind is designated by the reference sign 55 in FIG. 3 and, when the upper plate 10 is moved, with respect to the central plate 20, into a position situated close to the maximum path of travel of the upper plate 10 with respect to said central plate 20, causes the clamping lever 52 to come into contact with the unlocking part 55, as a result of which said clamping lever 52 is rotated against the elastic force 54 and the clamping of the object-holder means in the recess 6 is released.

The loading position is thus located, with respect to the path of travel of the microscope table 1 in the longitudinal direction, close to the maximum path of travel, and the recess 6 is thus moved, to the maximum extent, out of the position in which the optical axis of the microscope is located. This simplifies the removal of the object-holder means from the recess 6 or its insertion in the latter, since the objective or the condensing lens of the microscope, for example, is located sufficiently far away.

Figure 5:
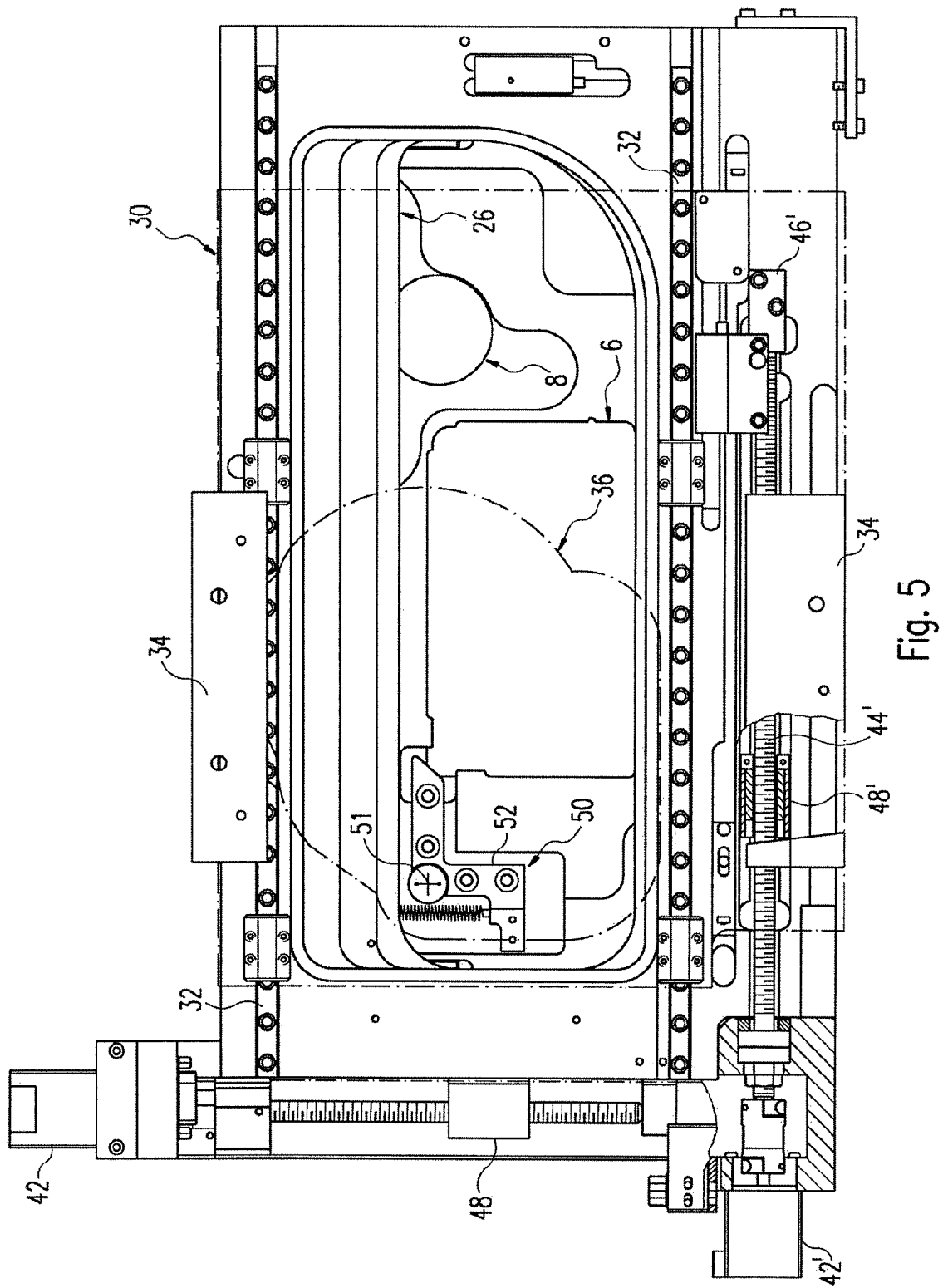
FIG. 5 is a view, from below, of the microscope table from FIG. 1, a bottom plate of said microscope table being represented in a transparent manner.

FIG. 5 shows a view of the microscope table 1 from below, the lower plate 30 being represented in a transparent manner by a chain-dotted line. In FIG. 5, it can be seen that the hole region 36 of the lower plate 30 is formed with a greater length than the perforated regions of the upper plate 10 and the central plate 20. This once again provides that, for each position in the plane of the recess 6 in the upper plate 10 which is moved into the optical axis of the microscope, an uninterrupted light path through the microscope table 1 is provided.

In FIG. 5, it can be seen that the central plate 20 is fastened to the lower plate 30 in a displaceable manner by rail-type means 32. In this case, however, said rail-type means 32 are disposed in the width direction. A conveying drive for displacing the central plate 20 with respect to the lower plate 30 is of similar design to the conveying drive previously described and comprises a thread-type drive 44' and a spindle-nut housing 481. In this case, however, the thread-type drive 44' is mounted on the lower plate 30 of the microscope table 1 by bearing means 46', and the spindle-nut housing 48' placed on the thread-type drive 44' is connected to the central plate 20 via an entrainment means.

It can also be seen from FIG. 5 that adapter plates 34, which serve to attach the microscope table 1 to a table or stand belonging to microscopes of a different type, are attached to the underside of said microscope table 1. Said adapter plates 34 have means for attachment to the table or stand and fastening means for attachment to the lower plate 30 of the microscope table. The adapter plates 34 may be attached to the lower plate 30 of the microscope table in a simple manner, for example by a plug-in connection, and are adapted to a certain type of microscope in each case. This means that the microscope table 1 can be employed in different types of microscope by using different types of adapter plates.

The paths of travel of the microscope table 1 are dimensioned in such a way that, when said microscope table 1 is installed in the microscope, the entire region, which can be used for receiving objects, of a microtiterplate which has been inserted in the recess 6 can be moved into the optical axis of the microscope. Furthermore, it is also possible to move the additional hole region 8 into the optical axis of the microscope. The loading position is located, as regards at least one direction of travel of the microscope table, in a position close to the maximum path of travel of said microscope table. As a result of this, the loading position is sufficiently far away from the optical axis of the microscope, so that, for example, the objective or the condenser lens of the microscope does not hinder the insertion of object-holder means in the recess 6, or their removal therefrom. For this purpose, the path of travel of the microscope table 1 amounts to 76 mm in the longitudinal direction and 161 mm in the width direction.

The path of travel is of asymmetrical configuration in the width direction and amounts, with respect to the central point of the recess 6, to 102 mm in the direction of the loading position and to 59 mm in the opposite direction.

As a result of this, collisions with the objective or condenser lens of the microscope when these are inserted or removed are avoided in the loading position.

Figure 6:
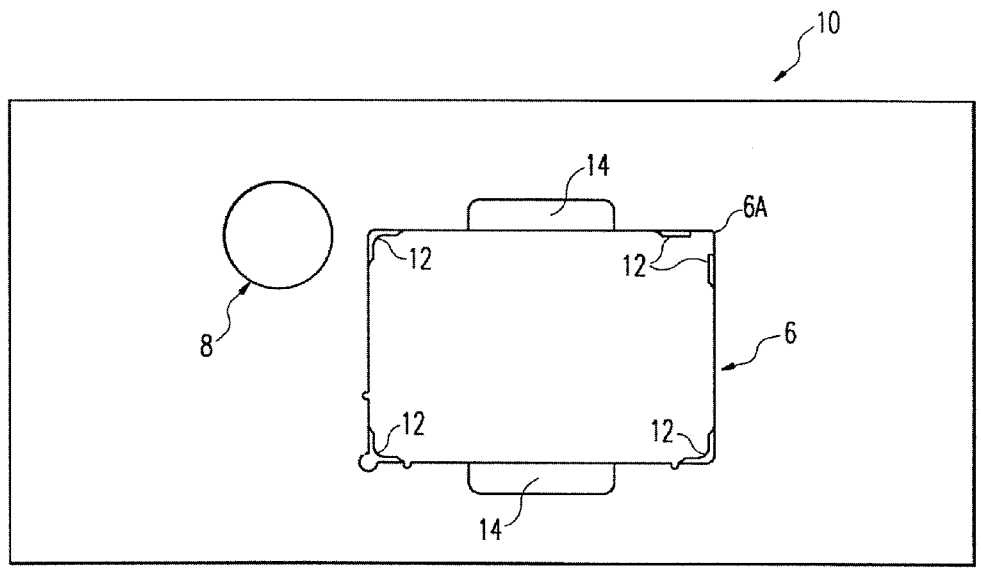
FIG. 6 is a plan view of the upper plate of the microscope table from FIG. 1.

FIG. 6 shows a plan view of the upper plate 10 of the microscope table 1. The recess 6 is configured as a hole region which penetrates the entire thickness of the upper plate 10. However, projections 12 which delimit said recess towards one side of the upper plate 10, that is to say downwards, are constructed at the edges of said recess 6. Said projections 12 are formed in corner regions of the substantially rectangular region of the recess 6 and protrude into the hole region. However, the extension of the projections 12 into the hole region is comparatively small compared to the overall extent of said hole region, so that only a small portion of the area of the hole region is masked by said projections 12. However, one corner of the substantially rectangular region of the recess 6 has no projection formed in it, so that, in this region, the clamping lever 52 is able to make contact with an object-holder means which has been inserted in said recess 6 and to clamp it in and align it with respect to the opposite lateral edges of the latter. Formed on two opposite sides of the recess 6 are clearance regions 14 in which said recess 6 deviates from the substantially rectangular shape of a standard microtiterplate. Lateral edges of an object-holder means which has been inserted in the recess 6 are exposed in the clearance regions 14, so that said object-holder means can be easily gripped at these edges and its insertion in said recess 6, or removal from the latter, is thus simplified. The clearance regions 14 may, in particular, be provided with a greater depth than the substantially rectangular region of the recess 6, so that it is also possible to gain a hold under an object-holder means which has been inserted in said recess 6.

Figure 7:
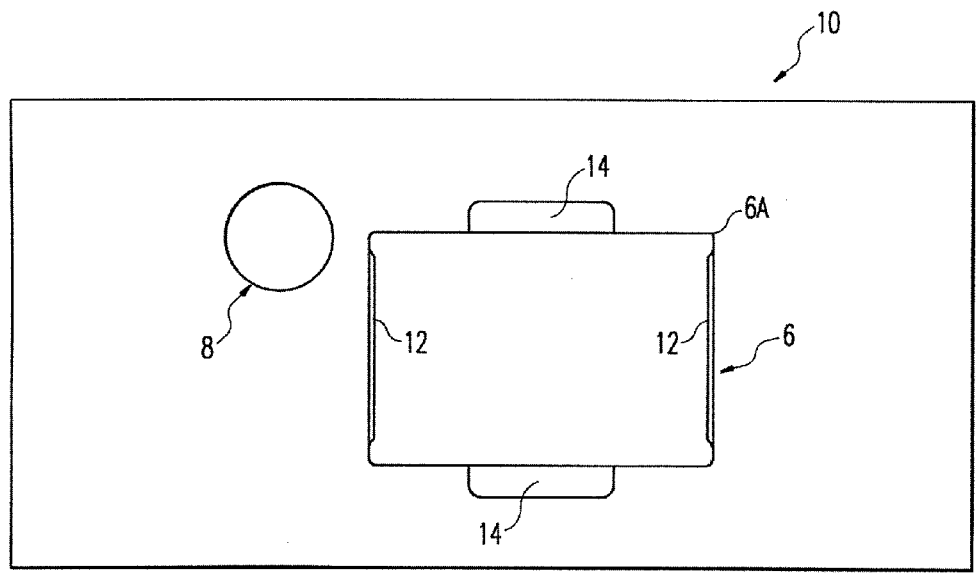
FIG. 7 shows an alternative embodiment of the recess in the upper plate from FIG. 6.

FIG. 7 shows an alternative embodiment of the projections 12 in the recess 6. The structure of the recess shown in FIG. 7 corresponds substantially to that from FIG. 6, but the projections 12 are formed along two opposite edges. Once again, however, one corner 6A of the recess 6 has no projection formed in it, so that the clamping of the object-holder means in said recess 6 can take place in this region.

Figure 8:
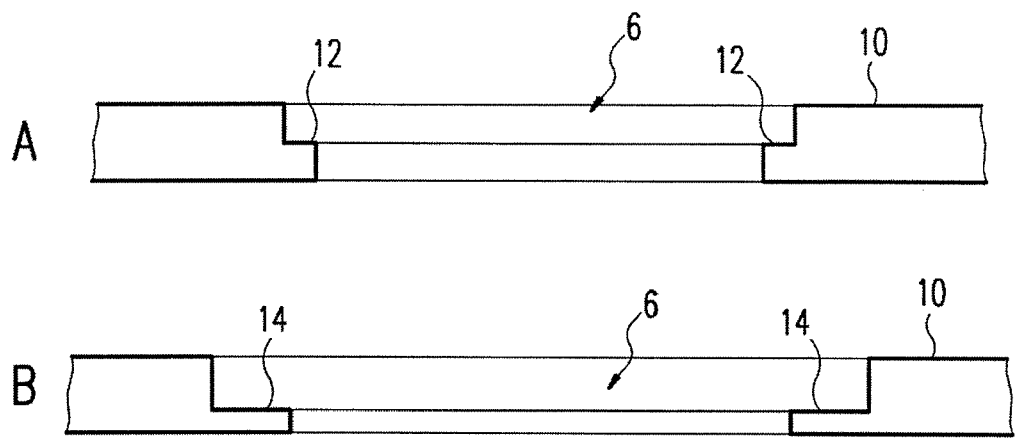
FIG. 8 shows diagrammatically, in a sectional view, projections and clearances which are constructed at the edge of the recess in the microscope table.

FIG. 8 shows, diagrammatically and in each case in a sectional view, the projections 12 and the clearance regions 14 of the recess 6. In the figure, a section through the projections 12 is designated by A, and a section through the clearance regions 14 by B. In the figure it can be seen, in particular, that the recess 6 is delimited downwards by the projections 12. A hole region is constructed between said projections 12. In the clearance regions 14, the recess 6 has a greater depth than is defined by the projections 12. As a result of this, it is possible, in the clearance regions 14, to gain a hold, for example by means of a suitable tool, even under an object-holder means which has been inserted in the recess 6.

Figure 9:
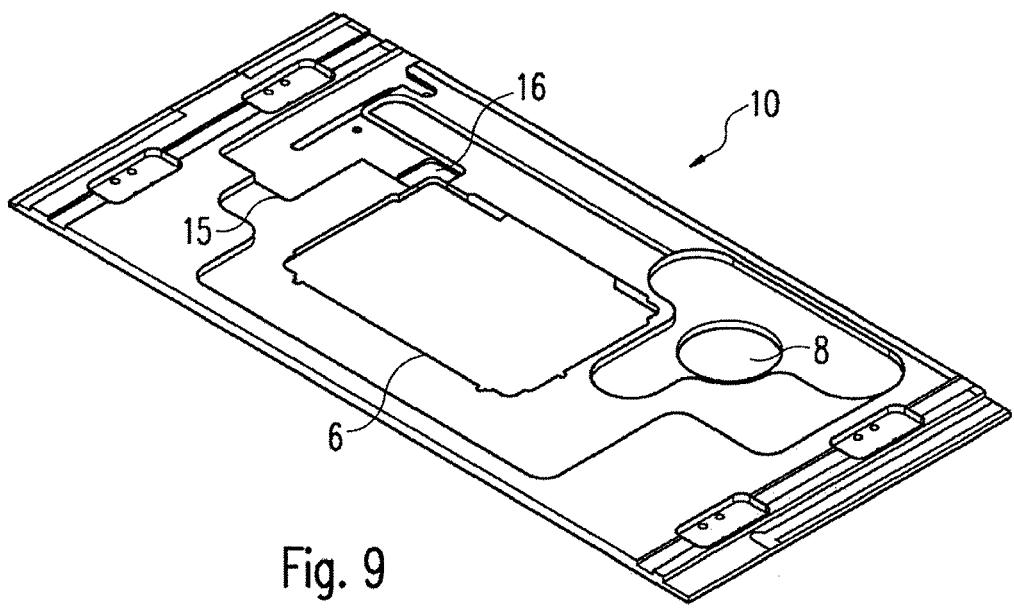
FIG. 9 shows a perspective view, from below, of the upper plate of the microscope table.

FIG. 9 shows a perspective view, from below, of the upper plate 10. As can be seen from FIG. 9, recesses of different types are formed on the underside of the upper plate 10. In particular, there is formed on the underside of said upper plate 10 a recess 15 which is intended to receive the clamping lever 52 of the retaining means 50.

This recess 15 ensures that the clamping lever 52 is able to act laterally on the object-holder means which has been inserted in the recess 6. The recess 15 comprises a region 16 having a greater depth than said recess, the region 16 of the recess being intended to receive the thickened portion at the second end 52B of the clamping lever 52. Overall, this configuration of the upper plate 10 permits reliable lateral clamping of object-holder means in the recess 6.

Figure 10:
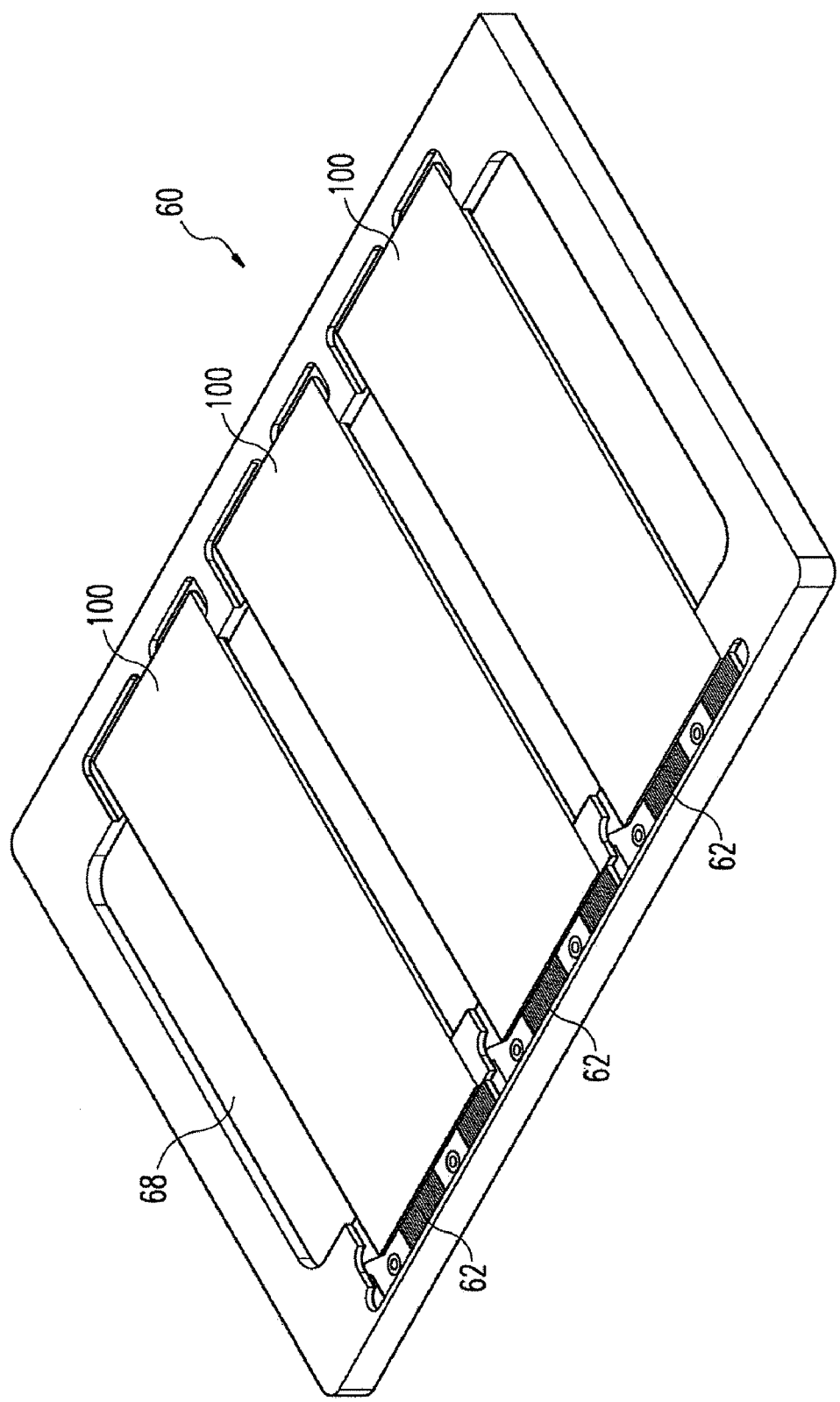
FIG. 10 is a perspective view of an insert according to one exemplary embodiment of the invention.

FIG. 10 shows an example of an insert 60 for receiving object-holder means. The insert 60 is configured for receiving three glass object-holders. Said insert 60 has a substantially rectangular contour, its length and width corresponding to those of a standard microtiterplate. This means, specifically, that the insert has a length of 85.5 mm and a width of 127.8 mm. Said insert can thus be employed in the recess 6 of the microscope table 1 previously described. The insert can also be used in a large number of laboratory instruments which are adapted to the dimensions of a standard microtiterplate.

The insert 60 has three recesses 61 which are each suitable for receiving an object-holder means 100 in the form of a glass object-holder. For this purpose, said recesses each comprise a substantially rectangular region whose length and width at least corresponds to the length and width of one of the glass object-holders. Also constructed in the insert 60 is a hole region 68 which thus makes it possible to bring the object-holder means 100 into the light path of a microscope by means of the insert 60. Attached to one side of the recesses 61 are retaining means 62 which each hold and align one of the object-holder means 100 in the respective recess 61 by lateral clamping between said retaining means 62 and side walls of the recess.

Figures 11A, 11B:
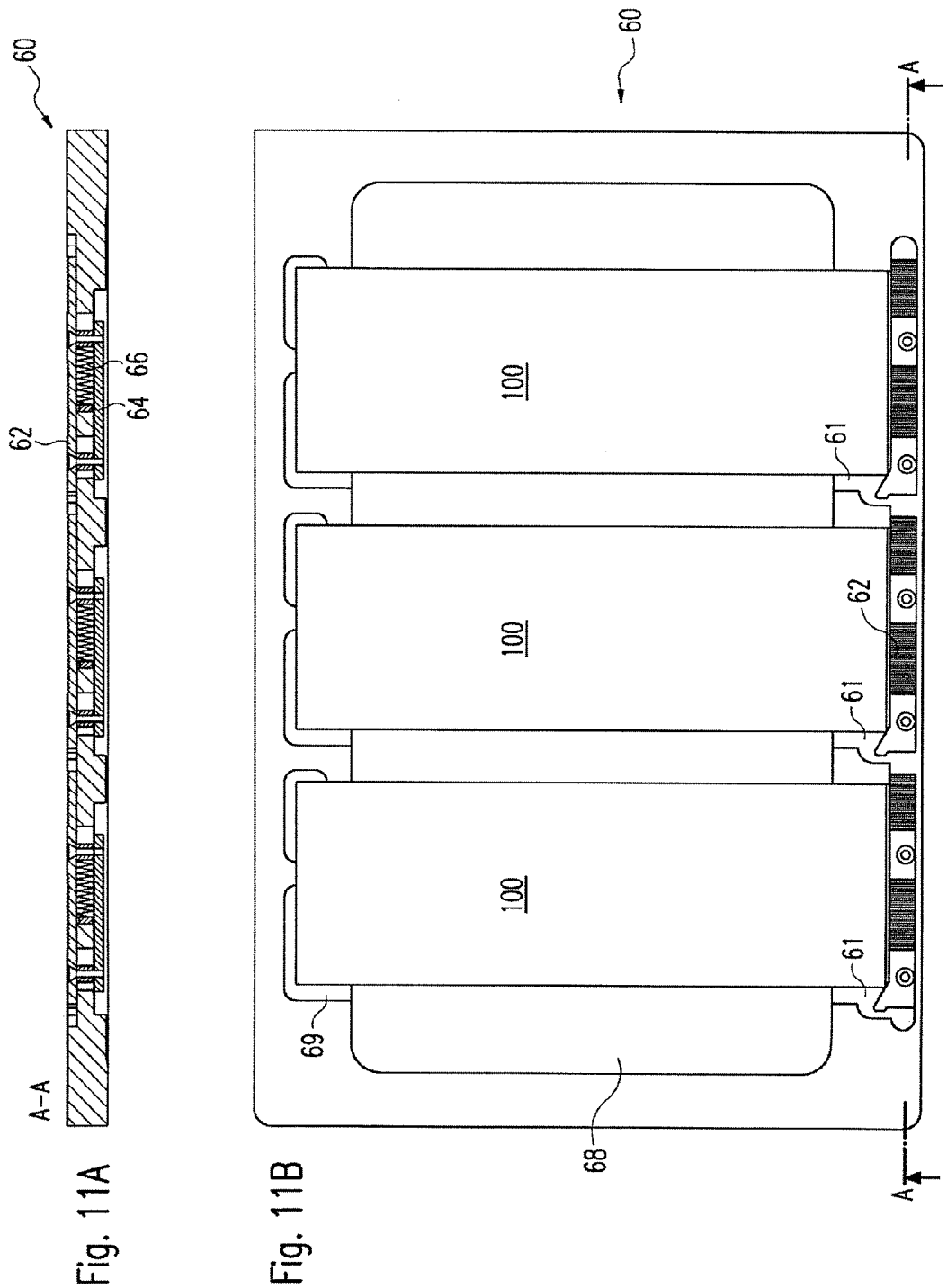
FIG. 11A is a vertical sectional view of the insert from FIG. 10, in a width direction of said insert.
FIG. 11B is a plan view of the insert from FIG. 10.

FIG. 11A shows a cross-sectional view of the insert 60, in which it can be seen that the retaining means 62 are attached, by means of a counter-piece 64 located on the opposite side of the insert 60, so as to be displaceable in the plane of said insert 60 against the elastic force of a spring means 66. FIG. 11B shows a plan view of the insert 60. It can be seen that there is disposed, in each of the recesses 61 in the insert 60, a retaining means 62 which is in the form of a slide and which holds and aligns the object-holder means 100 in the form of a glass object-holder in said recess 61. The hole region 68 protrudes laterally beyond the object-holder means 100 disposed in the insert, so that these can be removed from the insert 60 in a simple manner by taking hold of them laterally. Also constructed at the edges of the recesses 61 are clearance regions 69 which, once again, make it easier to insert and remove object-holder means 100.

The object-holder means 100 are, specifically, object-holders which comply with standard DIN ISO 8037-1, that is to say have a width of 25-26 mm and a length of 75-76 mm.

Figure 11C:
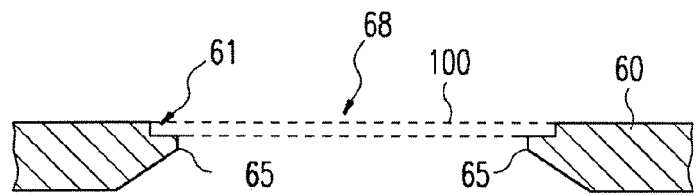
FIG. 11C shows, by way of an example and in a sectional view, projections which are constructed in a hole region of the insert from FIG. 10.

FIG. 11C shows, diagrammatically, a sectional view through the insert 60. The hole region 68 constructed in the insert comprises, at its edges, projections 65 which delimit the recess 61 towards one side of said insert 60, that is to say downwards. The depth of said recess 61 is selected in such a way that an upper boundary surface of an object-holder means 100 which has been inserted in the insert 60 is aligned substantially flush with the upper boundary surface of said insert 60. On their lower side which faces away from the object-holder means 100, the projections 65 are provided with an oblique edge, so that the hole region 68 increases in size in the downward direction. This makes it simpler, for example, to bring an objective closer to the object-holder means 100, even from below, without obstructions occurring because of the edges of the perforated region 68.

Figure 12A:
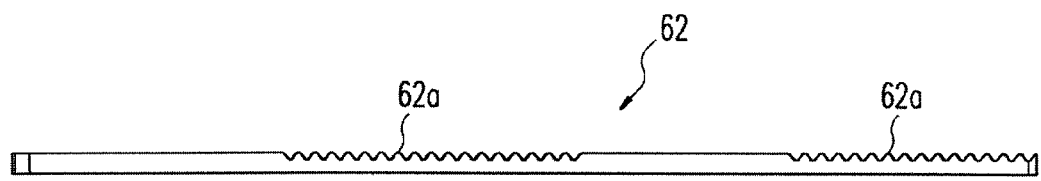
FIGS. 12A and 12B show a side view and a plan view, respectively, of retaining means on the insert from FIG. 10.
Figure 12B:
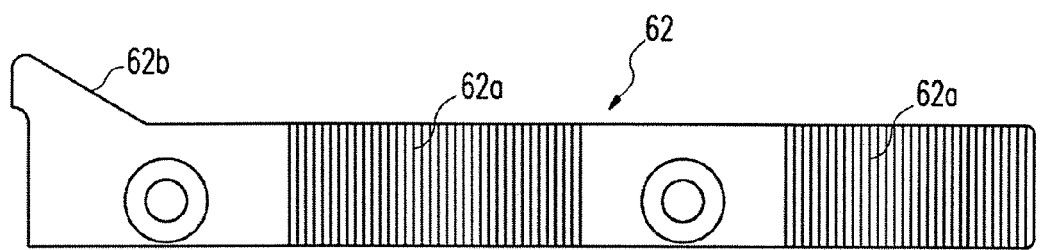

The retaining means 62 of the insert 60 is represented separately in FIGS. 12A and 12B. The view in FIG. 12A is a side view of the retaining means 62. Within the insert 60, said retaining means 62 has the function of a slide which can be displaced against the elastic force of the spring means 66 for the purpose of inserting an object-holder means 100. After the insertion of said object-holder means 100, the latter is clamped laterally against the side walls of the recess 61 by the elastic force of the spring means 66. For easier displacement of the retaining means 62, the latter has roughened regions 62a on its upper boundary surface. These provide a better grip for the lateral displacement of said retaining means 62. FIG. 12B shows a plan view of the retaining means 62, in which it can be seen that the latter has a substantially strip-shaped contour. At one end 62b of said retaining means 62, the width of the latter is increased and an oblique edge 62b is formed which is intended to come into contact with a corner of the object-holder means 100 in order to clamp and align the latter in the recess 61 of the insert 60. Here, the oblique edge 62b ensures that alignment takes place both in the longitudinal direction and in the width direction of the insert at the same time.

Figure 13:
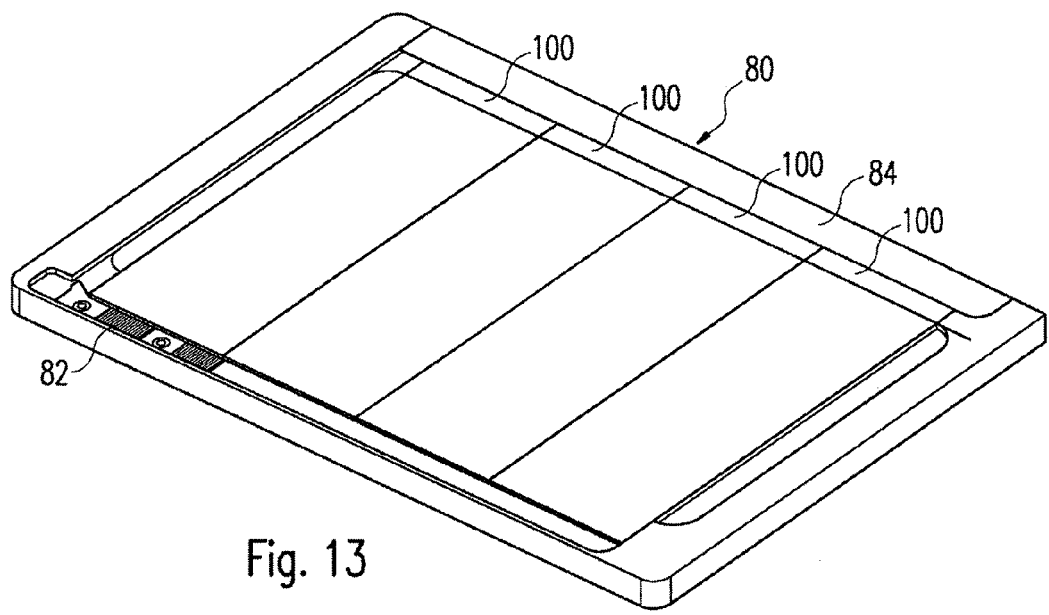
FIG. 13 shows a perspective view of an insert according to another exemplary embodiment of the invention.
Figure 14:
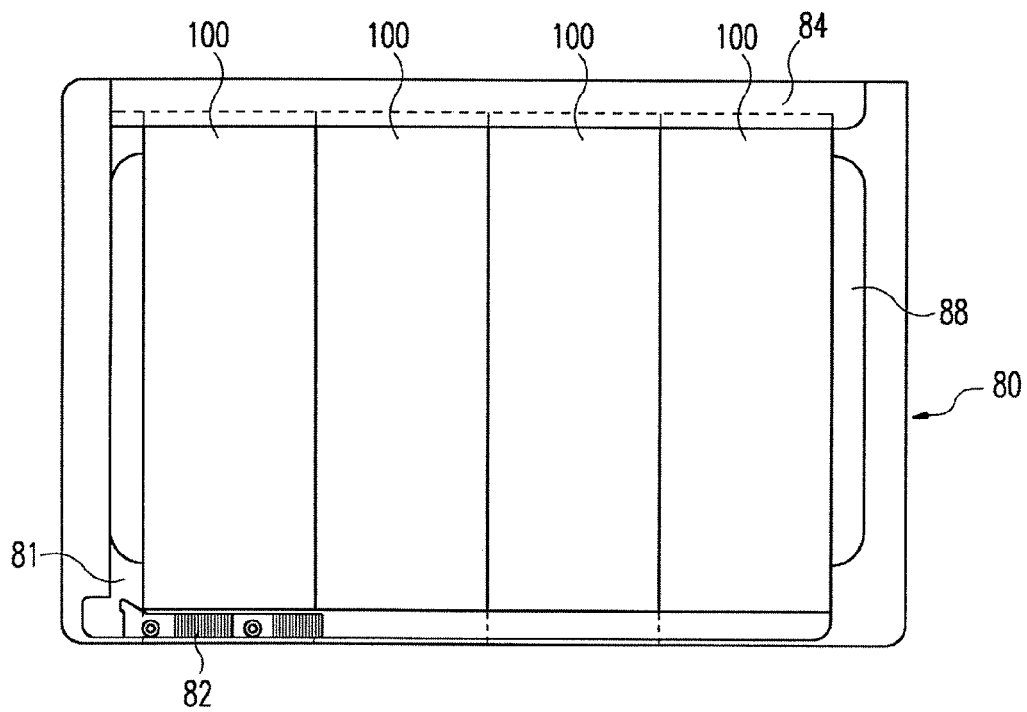
FIG. 14 shows a plan view of the insert from FIG. 13.

FIG. 13 shows, in perspective, a further example of an insert 80 for receiving object-holder means. FIG. 14 shows a plan view of the insert 80. Said insert 80 is configured for receiving object-holder means 100 in the form of glass object-holders. It is possible, in particular, to dispose four glass object-holders side by side in the insert 80 in the direction of the width of the latter. Under these circumstances, the object-holder means 100 rest against one another at their longer lateral edges. The structure of the insert 80 corresponds substantially to that of the insert 60, although only one recess 81 is provided, which is suitable for receiving a total of four of the object-holder means 100. A hole region 88 corresponding to the hole region 68 in the insert 60 is formed in the insert 80. Retaining means 82 in the insert 80 correspond to the retaining means 62 in the insert 60, although only one common retaining means 82 is provided for the object-holder means 100, of which there are four in all. The insert 80 is configured in such a way that said object-holder means 100 can be inserted in the recess 81 in a manner directly adjoining one another. They are clamped against one another and, at the same time, against the side walls of the recess 81 by the retaining means 82 and are thus held and aligned in said recess 81. In order to prevent said object-holder means 100, which are pressed laterally against one another by the elastic force of the retaining means 82, from giving way upwards under this pressure, an overhang 84, which protrudes over the object-holder means 100, is formed on a side of the insert 80 that lies opposite said retaining means 82. This overhang may be formed, for example, by a metal cover plate which is bonded onto the edge of the recess 81 from above.

Figure 15:
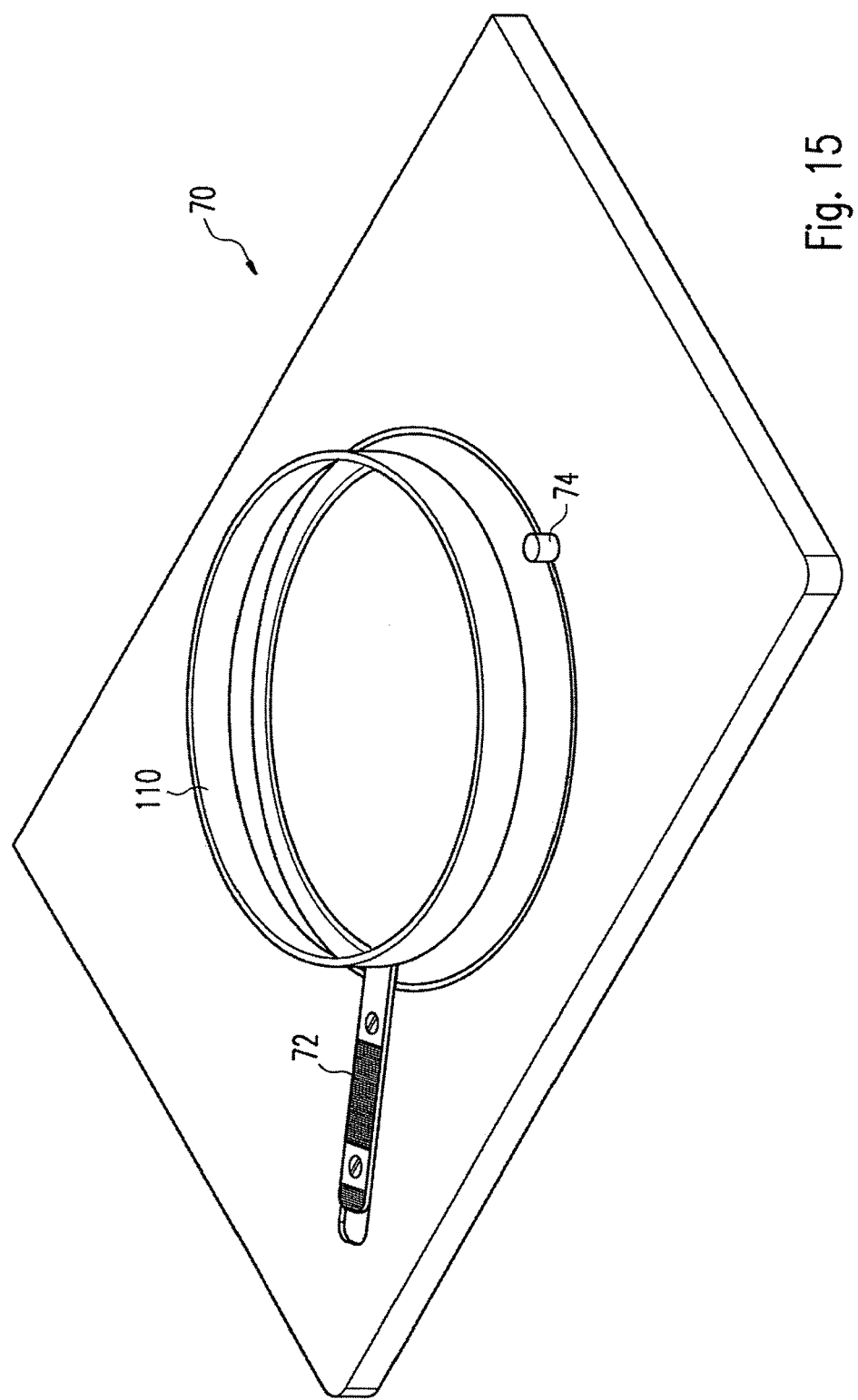
FIG. 15 is a perspective view of an insert according to another exemplary embodiment of the invention.
Figure 16:
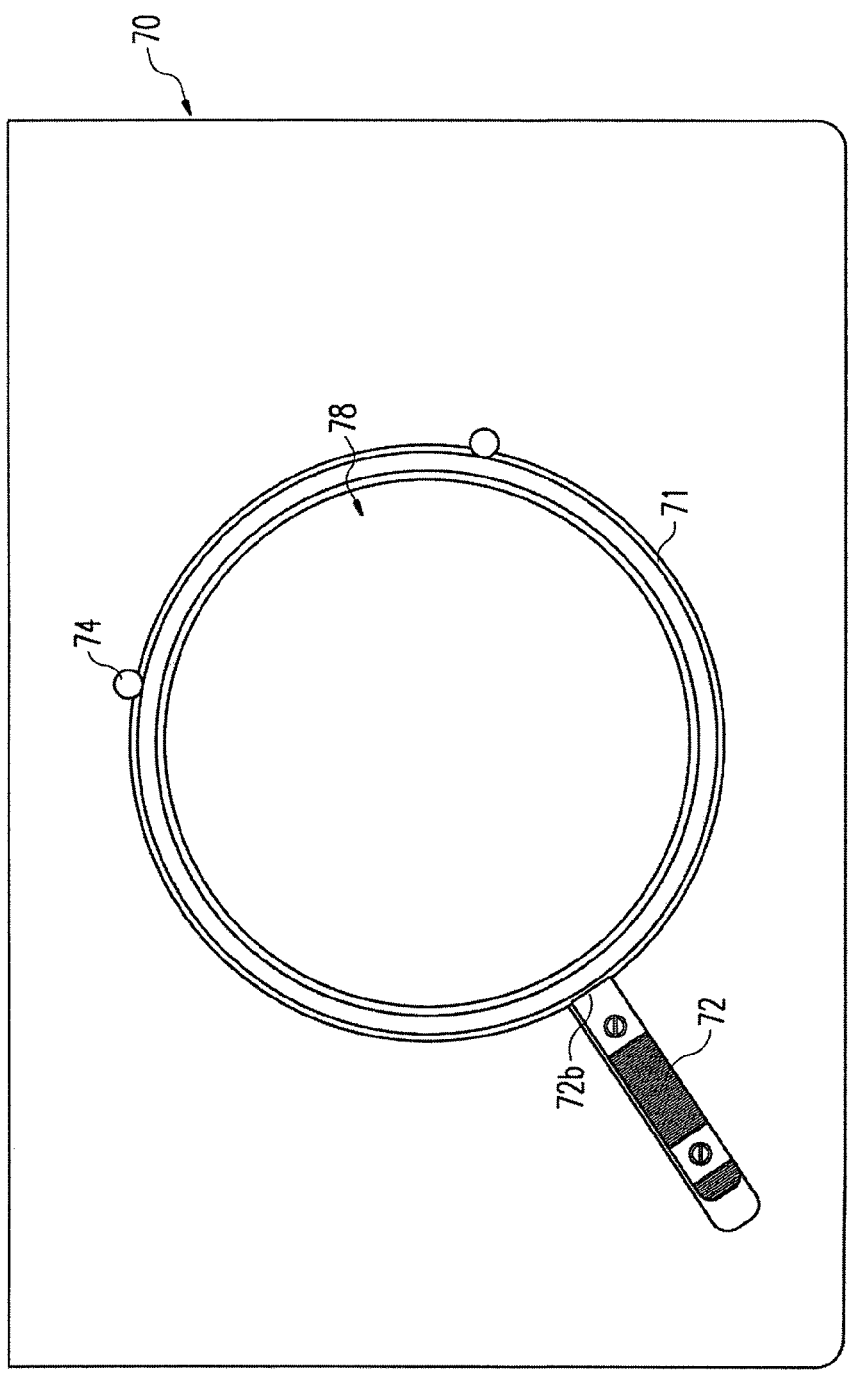
FIG. 16 shows a plan view of the insert from FIG. 15.

FIG. 15 shows another example of an insert 70 for receiving object-holder means. The insert 70 is represented in perspective in FIG. 15. FIG. 16 shows a plan view of said insert 70. It is configured for receiving round object-holder means 110, for example in the form of a Petri dish. The outer shape of the insert 70 corresponds to that of the inserts 60 and 80. However, a circular recess 71, which is suitable for receiving a Petri dish, is constructed in the insert 70 in a manner which differs from the inserts 60 and 80. A hole region 78, which is likewise circular and has a smaller diameter than the recess 71, is constructed concentrically inside said circular recess 71. There is thus constructed in the recess 71, a projection which extends round it in a circular manner and which delimits said recess 71 in the downward direction in a manner similar to the projections 65 of the insert 60.

The insert 70 has retaining means 72 which substantially correspond, in their function, to those of the inserts 60 and 80, that is to say are constructed as slides. Unlike the retaining means 62, 82 previously described, however, the retaining means 72 act in a radial direction upon an object-holder means 110 which has been inserted in the recess 71. For this purpose, the retaining means is configured as a slide in a manner displaceable radially outwards against an elastic force. An object-holder means 110 which has been inserted in the recess is thus pressed laterally, by the elastic force of the retaining means 72, in the direction of the side walls of the recess 71 which lie opposite said retaining means 72.

The object-holder means 110 has an outside diameter which is slightly smaller than the diameter of the recess 71.

This also results in a differing curvature of the outer edges of the object-holder means 110 and of the side walls of the recess 71. In order to ensure reliable clamping of the object-holder means 110 in the recess 71 in spite of these differing curvatures, pins 74, which protrude slightly into the recess 71, are attached at two points on the side wall of said recess 71. Said pins 74 thus form contact points for clamping the object-holder means 110 in the recess 71. The pins 74 improve the clamping and alignment of said object-holder means 110 in the insert 70, and a lower accuracy of fit is required for the circular object-holder means 110 and the circular recess 71.

Because of their contour and size, the inserts described above are suitable for insertion in the recess 6 in the microscope table 1. This means that said microscope table 1 is able to use as the object-holder means, in the first place, a standard microtiterplate, but also a large number of other object-holder means which have overall dimensions that do not exceed those of a standard microtiterplate. For this purpose, use is made of the various inserts described above.

In addition to the inserts described above, a large number of other shapes of inserts are conceivable, which are adapted to specific object-holder means in each case in order to be able to dispose these in the microscope table 1.

In this connection, it may be particularly advantageous to additionally provide the inserts with a coding system and to provide the microscope table 1 with means for detecting the said coding system, so that the movement toward object-holder means in the inserts can be largely automated. Thus, a control unit for conveying the microscope table 1 might automatically control the movement toward different positions of object-holder means in the insert.

Furthermore, the recess 6 and the inserts 60, 70, 80 are designed, in their shape, within the limits of the specifications of the ANSI/SBS 1-2004 standard in such a way that they can be inserted in the recess 6 in only one orientation. In the case of the examples represented, this is accomplished by the fact that one corner of the inserts 60, 70, 80 and of the recess 6 is contoured in a pointed manner, whereas the other corners are provided with rounded portions.

The invention claimed is:

1. A microscope table having a recess to receive an object-holder means,
   wherein the recess is dimensioned in such a way that it is suitable for receiving a standard microtiterplate and wherein the microscope table has a hole region disposed outside the recess and wherein paths of travel of the microscope table are configured so that the hole region can be brought into an observation position in which an optical axis of a microscope system provided with the microscope table extends through the hole region.

2. The microscope table according to claim 1,
   wherein the recess comprises, in a plane of the microscope table, a substantially rectangular region with a length of at least 86 mm and a width of at least 128.3 mm.

3. The microscope table according to claim 1, further comprising retaining means to hold and align the object-holder means, which has been inserted in the recess by clamping.

4. The microscope table according to claim 3,
   wherein the retaining means are configured in such a way that the clamping takes place laterally between the retaining means and side walls of the recess.

5. The microscope table according to claim 1,
   wherein the microscope table is configured so as to be capable of travel in a longitudinal direction and a width direction, a maximum path of travel of the microscope table in the longitudinal direction corresponding at least to a length of a region of the standard microtiterplate that can be used for receiving objects, and a maximum path of travel of the microscope table in the width direction corresponding at least to a width of the region that can be used for receiving objects.

6. The microscope table according to claim 5,
   wherein the maximum paths of travel are designed in such a way that the microscope table can be moved into a loading position.

7. The microscope table according to claim 6,
   wherein the loading position is disposed, with respect to at least one of the directions of travel, close to the maximum path of travel of the microscope table.

8. The microscope table according to claim 6, further comprising retaining means to hold and align the object-holder means, which has been inserted in the recess, in said recess by clamping,
   wherein the retaining means are configured in such a way that the clamping of the object-holder means is automatically released in the loading position.

9. The microscope table according to claim 1,
   wherein the maximum path of travel of the microscope table in the longitudinal direction amounts to at least 76mm and the maximum path of travel in the width direction amounts to at least 161 mm.

10. The microscope table according to claim 1,
    wherein another hole region is formed inside the recess.

11. The microscope table according to claim 10,
    wherein projections delimiting the recess downwards are formed at edges of the hole region.

12. The microscope table according to claim 1,
    wherein the recess comprises at least one clearance region which is formed at its edge.

13. A microscope table system comprising:
    a microscope table having a recess to receive an object-holder means; and
    an insert,
    wherein the recess is dimensioned in such a way that it is suitable for receiving a standard microtiterplate, and the insert has a substantially rectangular shape with a width and length which correspond to a width and length, respectively, of the standard microtiterplate and wherein the microscope table has a hole region disposed outside the recess and wherein paths of travel of the microscope table are configured so that the hole region can be brought into an observation position in which an optical axis of a microscope system provided with the microscope table extends through the hole region.

14. The microscope table system according to claim 13,
    wherein the insert has a length of about 85.5 mm and a width of about 127.8mm.

15. The microscope table system according to claim 13,
    wherein the insert has at least one recess to receive the at least one object-holder means.

16. The microscope table system according to claim 13,
    wherein the insert has retaining means to hold the at least one object-holder means in the insert.

17. The microscope table system according to claim 16,
    wherein the retaining means are configured to hold and align the at least one object-holder means in the insert by clamping.

18. The microscope table system according to claim 17, the insert further comprising at least one recess to receive the at least one object-holder means,
    wherein the retaining means are configured in such a way that the clamping takes place laterally between side walls of the at least one recess and the retaining means.

19. The microscope table system according to claim 13,
    wherein the insert is configured to receive the at least one object-holder means in the form of a glass object-holder.

20. The microscope table system according to claim 19, the insert further comprising at least one recess having a substantially rectangular region which has a length and width which correspond at least to a length and width, respectively, of the glass object-holder.

21. The microscope table system according to claim 20,
    wherein the length or width of the recess corresponds to at least an integral multiple of the width or length of the glass object-holder, so that a number of glass object-holders can be disposed side by side in the recess.

22. The microscope table system according to claim 20, the insert further comprising a plurality of recesses each having a substantially rectangular region which has a length and width which correspond at least to the length and width, respectively, of the glass object-holder.

23. The microscope table system according to claim 13,
    wherein the insert is configured to receive the object-holder means in the form of a Petri dish.

24. The microscope table system according to claim 23,
    wherein the insert comprises a circular recess whose diameter corresponds at least to a diameter of the Petri dish.

25. The microscope table system according to claim 13,
    wherein the insert comprises a hole region.

26. The microscope table system according to claim 13,
    wherein the insert is configured for insertion in the recess of the microscope table.

* * * * *

UNITED STATES PATENT AND TRADEMARK OFFICE
CERTIFICATE OF CORRECTION

| | |
|---|---|
| PATENT NO. | : 7,576,912 B2 |
| APPLICATION NO. | : 11/557356 |
| DATED | : August 18, 2009 |
| INVENTOR(S) | : Karin Schütze et al. |

It is certified that error appears in the above-identified patent and that said Letters Patent is hereby corrected as shown below:

COLUMN 2,

Line 26, "according to claim 1 and/or an insert according to claim 15 for" should read --according to claim 1 and/or an insert for--.

Signed and Sealed this

Twenty-ninth Day of December, 2009

David J. Kappos
*Director of the United States Patent and Trademark Office*